United States Patent
Dugan et al.

(10) Patent No.: US 6,564,306 B2
(45) Date of Patent: May 13, 2003

(54) APPARATUS AND METHOD FOR PERFORMING SPECULATIVE CACHE DIRECTORY TAG UPDATES

(75) Inventors: Michael K Dugan, Richardson, TX (US); Gary B Gostin, Plano, TX (US); Mark A Heap, Sunnyvale, CA (US); Terry C Huang, San Jose, CA (US); Curtis R. McAllister, Sunnyvale, CA (US); Henry Yu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 86 days.

(21) Appl. No.: 09/797,494

(22) Filed: Feb. 28, 2001

(65) Prior Publication Data

US 2001/0034815 A1 Oct. 25, 2001

Related U.S. Application Data

(63) Continuation of application No. 09/557,812, filed on Apr. 25, 2000, now abandoned.

(51) Int. Cl.$^7$ .............................................. G06F 12/12
(52) U.S. Cl. ........................... 711/155; 711/5; 711/141; 714/752
(58) Field of Search .................................. 711/155, 144, 711/145, 142, 143, 5, 141; 714/52, 752

(56) References Cited

U.S. PATENT DOCUMENTS

| | | | | |
|---|---|---|---|---|
| 5,235,693 A | * | 8/1993 | Chinnaswamy et al. ..... | 711/155 |
| 5,276,849 A | * | 1/1994 | Patel ...................... | 365/230.05 |
| 5,860,113 A | * | 1/1999 | Tung .......................... | 711/142 |
| 6,006,317 A | * | 12/1999 | Ramagopal et al. .......... | 712/23 |
| 6,065,103 A | * | 5/2000 | Tran et al. .................... | 711/156 |
| 6,101,614 A | * | 8/2000 | Gonzales et al. ............. | 710/39 |
| 6,349,366 B1 | * | 2/2002 | Razdan et al. .............. | 711/141 |
| 6,374,329 B1 | * | 4/2002 | McKinney et al. ......... | 345/777 |
| 6,397,302 B1 | * | 5/2002 | Razdan et al. .............. | 711/134 |

* cited by examiner

*Primary Examiner*—Do Hyun Yoo
*Assistant Examiner*—Brian R. Peugh

(57) ABSTRACT

An apparatus and method for performing speculative directory cache tag updates for read accesses to memory is herein disclosed. A control unit for performing tag updates is coupled between the memory controller and the memory bank in a multiprocessor system that employs a directory-based coherency protocol. The control unit transmits data read from the memory bank to the memory controller while calculating the updated tag that it then writes back to the memory bank. In this manner, the memory bank busy time and memory bus traffic are reduced thereby improving the overall performance of a memory access.

9 Claims, 5 Drawing Sheets

APPARATUS AND METHOD FOR PERFORMING SPECULATIVE CACHE DIRECTORY TAG UPDATES

CROSS REFERENCE TO RELATED APPLICATON(S);

This is a continuation of copending application Ser. No. 09/557,812 filed on Apr. 25, 2000, now Abandoned.

FIELD OF THE INVENTION

The present invention relates generally to computer systems. More particularly, the invention relates to a mechanism for updating cache memory tag data.

BACKGROUND OF THE INVENTION

A current trend in the design of scalable multiprocessor computer systems is to utilize a general interconnect network to connect clusters of processors. This particular design is advantageous over shared bus configurations of multiprocessors which were limited to the bandwidth of the bus. In such multiprocessor computer systems, each processor is associated with a memory that is accessible by other processors in the same cluster and by other clusters. Since the clusters are not connected by a shared bus, a snoopy bus protocol is not sufficient to maintain cache coherency. Instead, a directory-based coherency protocol is used to maintain cache coherency for data that is shared by the other clusters in the multiprocessor system.

A directory-based coherency protocol associates tags with each memory line. The tag can contain state information that indicates the ownership or usage of the memory line. The state information provides a means to track the data that is shared. Examples of the usage information can be whether the memory line is cached exclusively in a particular processor's cache, whether the memory line is shared by a number of processors, or whether the memory line is currently cached by any processor.

In order to maintain cache coherency, the tag is updated after each memory access. Typically, a memory controller is used to control access to the memory banks. For a read operation, the memory controller requests a memory line from the memory bank. When the memory line is retrieved from the memory bank, the memory controller then writes back the memory line with the updated tag to the memory bank. Although this method ensures cache coherency, it consumes a considerable amount of the memory bank's time in writing back the memory line with the updated tag information. Accordingly, there is a need to overcome this shortcoming.

SUMMARY OF THE INVENTION

In summary, the technology of the present invention pertains to an apparatus and method for performing speculative cache tag directory updates. In an embodiment of the present invention, a multiprocessor computer system is used where the system memory image is distributed amongst several cells and where portions of the system memory can be accessed from within a cell and/or between cells. A directory-based coherency protocol is used where each memory line has an associated tag that includes state information that identifies the owner or sharers of that memory line. The state information provides a means to track the data or memory lines that are shared within the multiprocessor system in order to maintain the system memory in a coherent manner.

A tag update unit is employed to update the tags whenever a word is read from a memory bank. A memory line that is read from a memory bank is simultaneously read back to the memory controller while the tag update unit calculates an updated tag and its corresponding ECC data. The updated word is then written back to the memory bank from the tag update unit.

The use of the tag update unit to calculate the updated tag data and to write back the word to the memory bank improves the overall system performance by reducing the memory bank busy time and the memory bus traffic. The memory bank busy time is reduced by overlapping the transmission of the word to the memory controller while the tag update unit calculates the updated tag data and writes the word to the memory bank.

The tag update methodology assumes that the word read from the memory bank does not contain any single or multi-bit errors and hence, speculatively performs the tag updates. The memory controller will receive the entire memory line and check the ECC portion of the memory line. If the memory controller detects a correctable error or an error in the updated tag, or if the memory controller incorrectly speculated the coherency for the tag, the memory controller will perform a subsequent memory access to overwrite the memory line having the corrupted data and/or tags. This subsequent memory operation will be performed before another access is made to the memory bank in order to prevent an access to the corrupted memory line. However, such errors are infrequent and the need to perform the subsequent write back is seldom.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
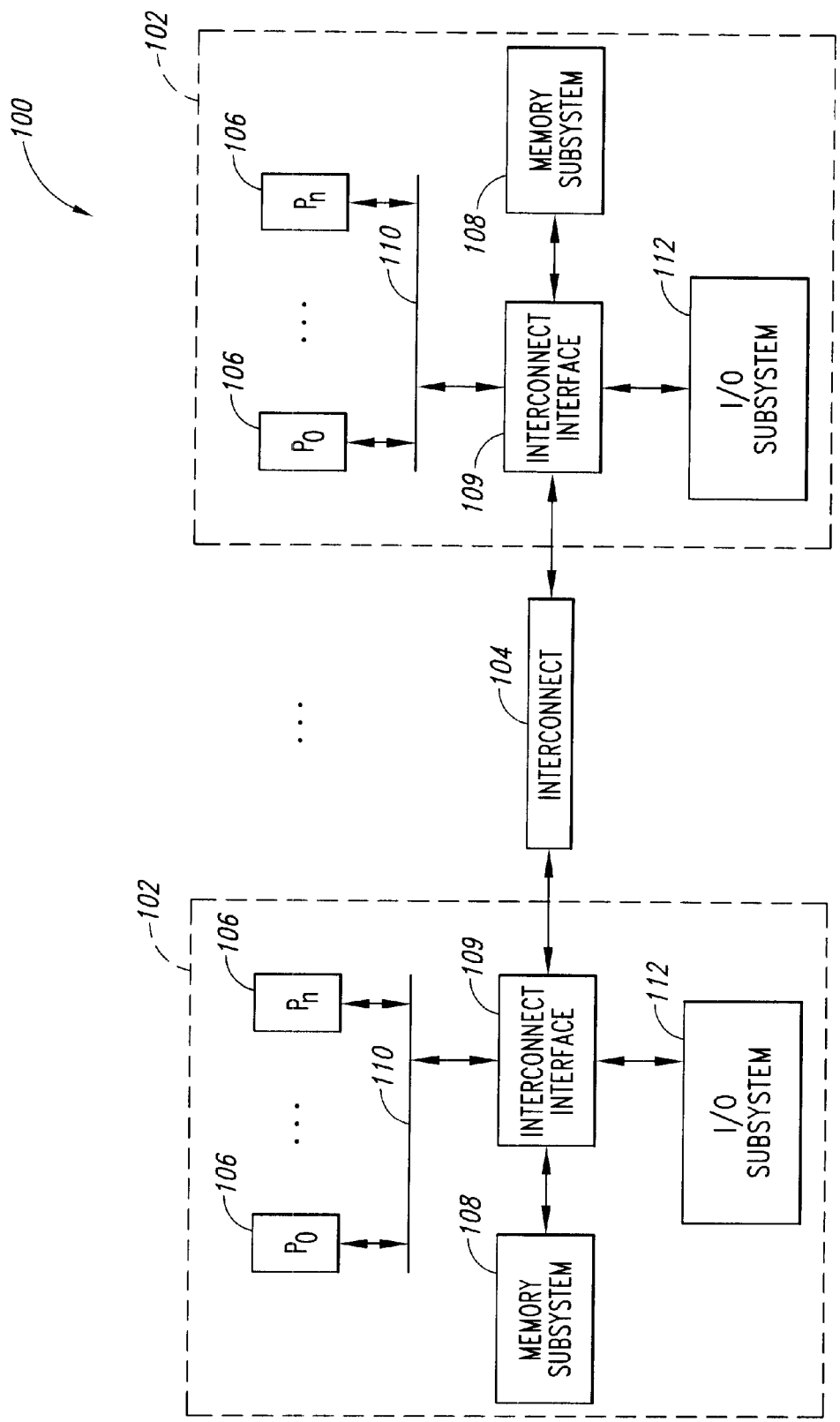
FIG. 1 is a schematic view of an exemplary computer system in accordance with an embodiment of the present invention.

FIG. 1 illustrates an exemplary computer system 100 embodying the technology of the present invention. There is shown a number of cells 102 connected to an interconnect 104 via an interconnect interface 109. Each cell 102 can include a number of processors (e.g., $P_0$-$P_n$) 106 connected to a memory subsystem 108 by a first communication link 110, such as a bus.

The processors 106 can be any type of processor or central processing unit ("CPU"), such as but not limited to, microprocessors and the like. Examples of such microprocessors include the Hewlett-Packard ("HP") PA-RISC family of microprocessors, the Intel IA-32 and IA-64 microprocessors, and the like. Each processor 106 has several levels of internal caches (not shown) that store a portion of the system memory that can be accessible by other processors 106 in the cell 102 and by other cells 102.

The memory subsystem 108 controls access to the system memory. Each cell 102 includes a portion of the system memory and the requisite components that maintain the system memory in a coherent manner. The system memory image of the multiprocessor computer system 100 is distributed throughout each cell 102 and can be partitioned to be accessible within each cell 102 and by other cells 102. For example, the system memory can include interleaved memory which is memory that is interleaved across cells 102 or non-interleaved memory which is memory that is accessible within a cell 102.

The interconnect 104 can be any type of high-speed communication link, such as but not limited to, a network, point-to-point link, crossbar switch, or the like. Preferably, a crossbar switch is used.

The I/O subsystem 112 can include a number of I/O devices such as but not limited to host bus adapters, bus bridges, graphics adapter, printers, audio peripherals, motion video peripherals, and the like.

The foregoing description has described an exemplary multiprocessor computer system 100 that embodies the technology of the present invention. Attention now turns to the architecture and operation of the memory subsystem 108.

Figure 2:
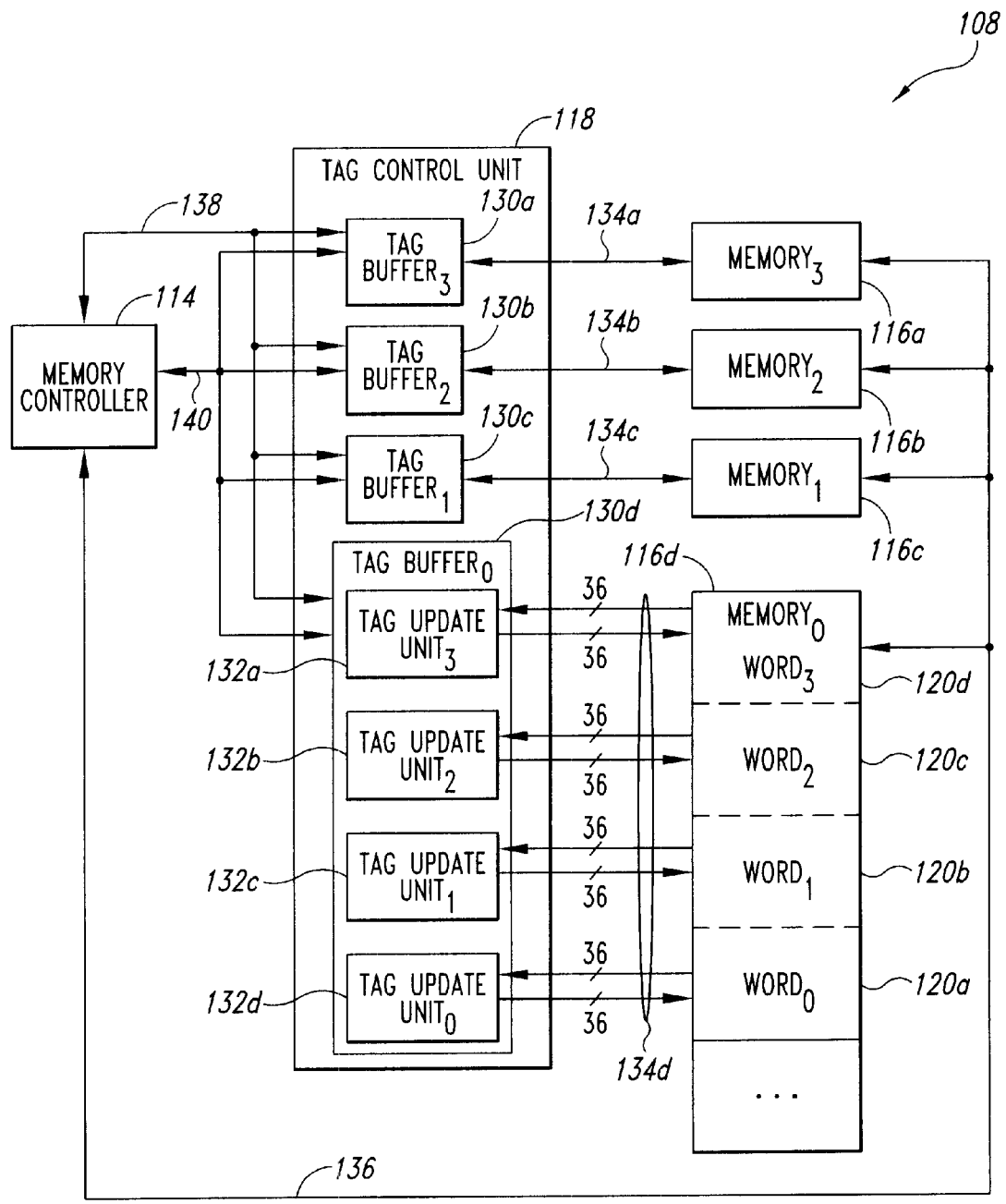
FIG. 2 is a block diagram further illustrating the memory subsystem shown in FIG. 1.

FIG. 2 illustrates the memory subsystem 108. There is shown a memory controller 114, a number of memory banks 116, and a tag control unit 118, each of which are coupled to each other. The memory controller 114 controls access to the memory banks 116 that store the system memory and the tag control unit 118 updates the tag portion 124 of a memory line 115 for read requests (see FIG. 3).

The memory banks 116 can be composed of any type of memory device or combination thereof, such as DRAM, SRAM, RAM, flash memory, and the like. Preferably, SRAM is used. Each memory bank 116 contains a number of memory lines 115 that can also be resident in any cache within the multiprocessor system 100.

A directory-based coherency protocol is used to maintain the system memory in a coherent manner. In the directory-based coherency protocol, each memory line 115 has an associated tag 124 that includes state information identifying the owner or sharers of that memory line 115. The state information provides a means to track the memory lines 115 shared within the multiprocessor system 100. The state information in the tag 124 can identify three possible states: idle; shared; or private. Idle indicates that a memory line 115 is not cached by another processor 106 or cell 102. A memory line 115 is shared when the memory line 115 is present in another cell 102 with read-only access to the memory line 115. Private indicates that memory line 115 is present in another cell 102 with read and/or write access.

Figure 3:
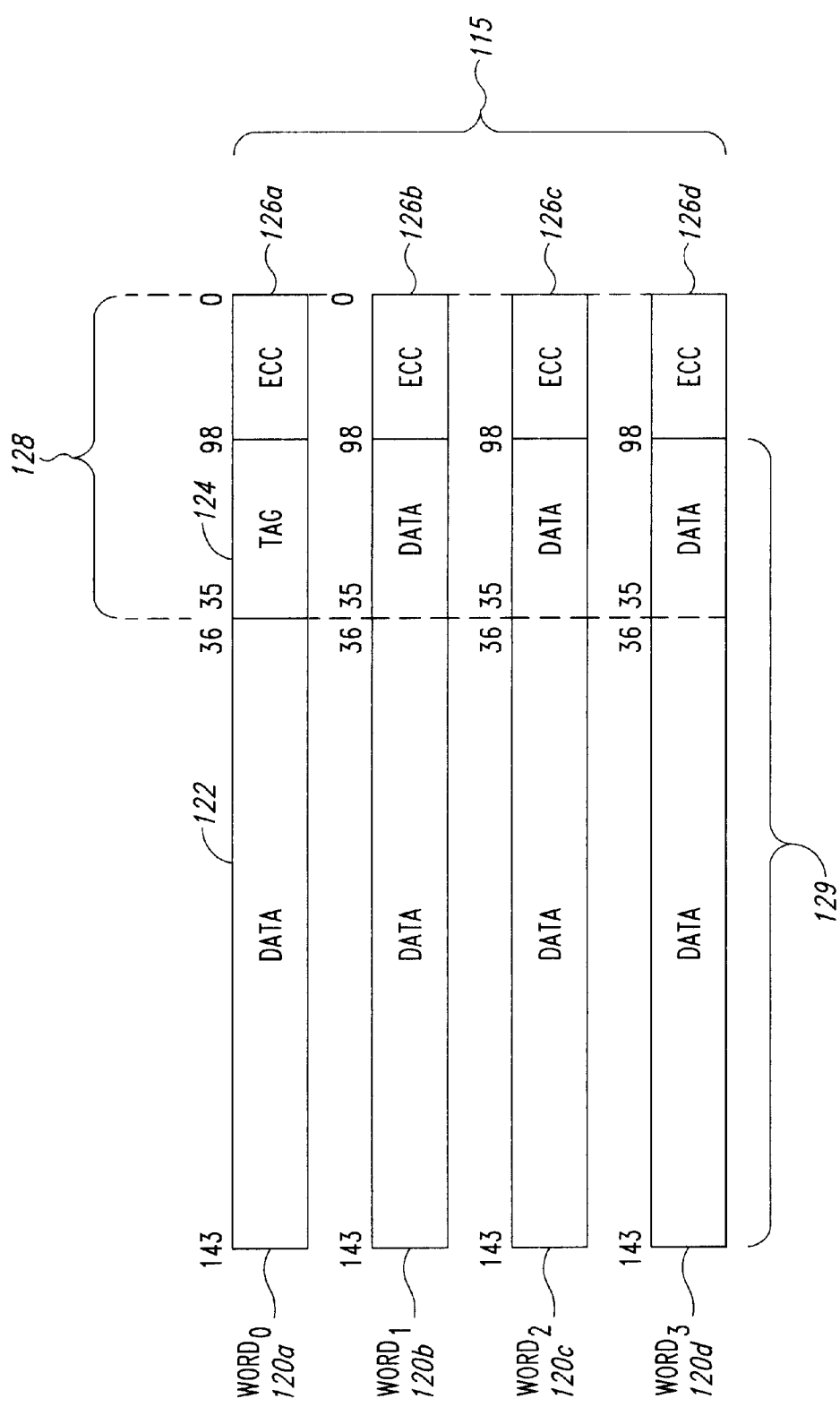
FIG. 3 illustrates the layout of an exemplary memory line.

FIG. 3 illustrates an exemplary layout of a memory line 115. A memory line 115 is composed of four memory words or words which are shown as follows: word$_0$, 120a; word$_1$, 120b; word$_2$, 120c; and word$_3$, 120d. Each word 120 is preferably 144-bits wide. The first word 120a includes a 108-bit data portion 122, a 27-bit tag portion 124, and a 9-bit error correction code ("ECC") portion 126. The tag portion 124 includes the state information that was described above. The second, third, and fourth words, 120b, 120c, 120d, do not include the tag portion 124 rather include the 9-bit EEC portion 126 and a 135-bit data portion 129.

Referring back to FIG. 2, the tag control unit 118 is coupled between the memory banks 116 and the memory controller 114 and is used to update the tag portion 124 of a memory line 116 in the case of a read request. The tag control unit 118 includes a number of tag buffer units 130. Preferably, there are four such tag buffer units 130.

Each tag buffer unit 130 includes a number of tag update units 132. Preferably, there are four tag update units 132 in each tag buffer 130. This is due to the fact that the data paths 134 between the memory banks 116 and the tag control units 118 are bit-sliced. Since the data paths 134 are 36-bits wide and a memory line 116 is 144-bits wide, then four such units 132 are required. However, the number of tag update units 132 or tag control units 118 is not a limitation of the technology of the present invention and other configurations of these devices can be used as well.

The memory controller 114 receives memory read and write requests and initiates the requisite actions needed to perform these requests. The memory controller 114 activates a command, control, and address signal 136 that is transmitted to each memory bank 116 in order to initiate access to a particular memory line 115. A control 138 and a data 140 signal is transmitted between the memory controller 114 and each tag buffer unit 130 in order to update the tags associated with a memory line 115 and to transfer data between the memory controller 114 and the memory banks 116.

However, only the tag update unit 132 receiving the first word will update the tag/ECC data 128. The other tag update units 132 will not perform the update function. Attention now turns to a brief summary of the operation of the tag update unit 132.

The tag buffer unit 130 interfaces between the memory controller 114 and a memory bank 116. A memory line 115 that is written to a memory bank 116 or read from the memory bank 116 passes through the tag buffer unit 130 to the memory controller 114 or the associated memory bank 116. In the case of a write request where a memory line 115 is written to a memory bank 116, the tag update unit 132 merely passes the data to the memory bank 116 without performing any additional processing. In the case of a read request where a memory line 115 is read from a memory bank 116, the memory line 115 is transmitted back to the memory controller 114 while the tag update unit 132 receiving the tag/ECC data 128 updates the tag/ECC data 128. The tag update unit 132 then writes out the updated word 120 to the associated memory bank 116 before another access is made to the memory bank 116. Those tag update units 132 not receiving a word 120 having tag data 124 do not update the word 120, rather write the word 120 back to the associated memory bank 116 unaltered.

The tag update unit 132 receiving the first word 120a having the tag data 124 updates both the tag portion 124 and the ECC portion 126b of the first word 120a. The tag portion 124 is updated in accordance with an internal control signal that indicates the updated state or usage of the memory line 115. The ECC portion 126b is updated to reflect the updated tag 124.

The tag update mechanism assumes that the memory line 115 read from the memory bank 116 does not contain any single or multi-bit errors. These errors cannot be checked by each tag update unit 132 since each tag update unit 132 only receives a portion of the entire memory line 115 thereby making it impossible for any tag update unit 132 to check the ECC portion 126 for the entire memory line 115. The memory controller 114 will receive the entire memory line 115 and check the ECC portion 126. If the memory controller 114 detects a correctable error or an error in the updated tag 124 or if the memory controller 114 incorrectly speculated the coherency tag, the memory controller 114 will perform a subsequent memory access to overwrite the memory line 115 having the corrupted data and/or tags. This subsequent memory operation will be performed before another access is made to the memory bank 116 in order to prevent another access to the corrupted memory line 115.

The occurrence of erroneous data in a memory line 115 read from a memory bank 116 is infrequent. For this reason, the tag update mechanism employed herein speculates that the tag update unit 130 receives uncorrupted data and updates the tag 124 and ECC data 126 for each memory line 115 thereby improving the performance of the memory access. In the event of a corrupted or erroneous memory line 115, the memory controller 114 corrects the memory line 115 and writes it out to the memory bank 116. This additional write increases the memory access time but since it occurs infrequently it is not a serious impediment to the performance of the multiprocessor system 100. Attention now turns a more detailed description of the tag update unit 132.

Figure 4:
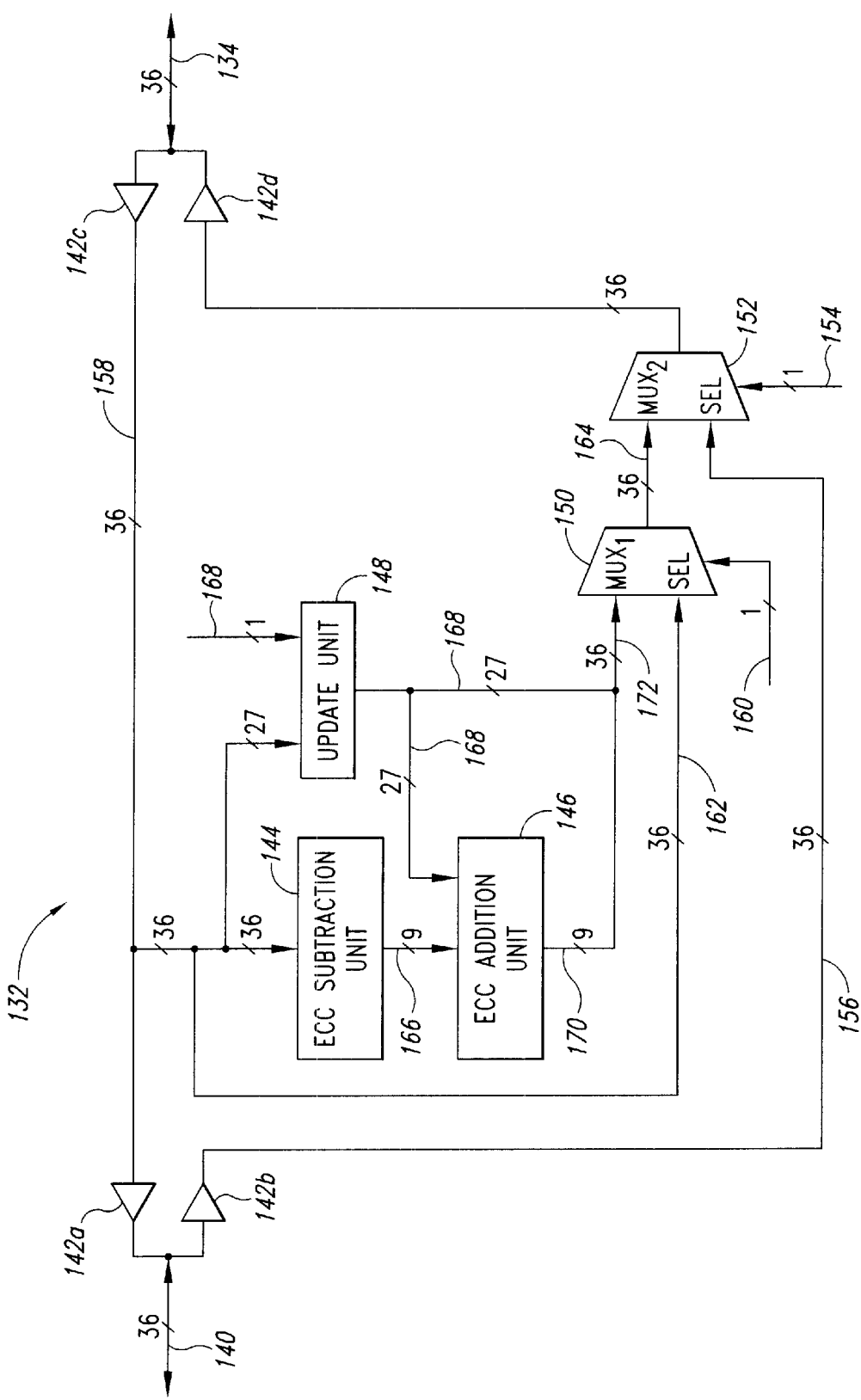
FIG. 4 is a block diagram illustrating the tag update unit shown in FIG. 2.

FIG. 4 illustrates the tag buffer unit 132. There is shown a number of buffers 142, an ECC subtraction unit 144, an ECC addition unit 146, an update unit 148, a first multiplexer 150, and a second multiplexer 152. The ECC subtraction unit 144, the ECC addition unit 146, and the update unit 148 can be constructed as state machines, as combinatorial logic units, or the like, and in any combination thereof. The operation of each of these components will be described with respect to a read and write access to the associated memory bank 116.

In the case of a write access, the memory controller 114 transmits on a first data path 156, a word 120 that is to be written to the memory bank 116. The word 120 is transmitted to the second multiplexer unit 152. The select signal 154 of the second multiplexer unit 152 is set internally within the tag update unit 132 in response to the control signal 138 that is transmitted by the memory controller 114. The control signal 138 indicates that the memory request is a write access. The second multiplexer unit 152 then selects the memory line 115 transmitted on data path 156 which is then transmitted to the memory bank 116.

In the case of a read access, the tag update unit 132 receives the combined tag/ECC portion 128 of a word 120. Each tag update unit 132 will transmit this data 128 on the second data path 158 to the memory controller 114. Those tag update units 132 that do not receive the tag portion 124, write out the tag/ECC portion 128 of the word 120 without updating it. The select signal 160 of the first multiplexer 150 is programmed so that the first multiplexer 150 always selects the data received from the third data path 162 which is the unaltered tag/ECC portion 128 of the word 120. The select signal 154 for the second multiplexer 152 is then set to select this output of the first multiplexer 164 which is then transmitted back to the memory bank 116.

Those tag update units 132 that receive the tag portion 124 will update the ECC 126 and tag 124 portions of the word 120. The 36-bit combined tag and ECC data 128 is transmitted to the ECC subtraction unit 144. The ECC subtraction unit 144 attempts to determine the initial ECC code that does not reflect the tag value 124. It does this by subtracting out the contribution of the tag portion 124 from the ECC data 126 thereby producing an intermediate ECC code 166.

Simultaneously, the update unit 148 receives the 27-bit tag data 124 and updates it in accordance with a directive 168 received internally in response to a command from the memory controller 114. The update unit 148 generates a 27-bit updated tag 168 which is then transmitted to the ECC addition unit 146.

The ECC addition unit 146 generates a new ECC code 170 based on the intermediate ECC value 166 and the updated tag 168. As such, the ECC addition unit 146 receives both the intermediate ECC data 166 and the updated tag 168 and generates a 9-bit updated ECC code 170. The updated ECC code 170 and the updated tag data 168 are then transmitted to the first multiplexer unit 150. The select signal 160 of the first multiplexer unit 150 is programmed to select the updated tag and ECC signal 172 since this particular tag update unit 132 receives the tag data 124. The updated tag and ECC signal 172 is then transmitted to the second multiplexer unit 152 which is set to select the output of the first multiplexer unit 150 in the case of read requests. The output of the second multiplexer unit 152 is then transmitted to the associated memory bank 116.

The foregoing discussion has described the architecture and operation of the tag update methodology. Attention now turns to a description of the benefits of the tag update mechanism.

In brief, the tag update mechanism described herein improves memory access performance by reducing the memory bank busy time and the memory bus traffic. The memory bank busy time is reduced by writing back the updated tag and ECC data 128 from the tag update unit 132 rather than performing the updated tag and ECC calculations from the memory controller 114 and having the memory controller 114 write back the updated tag and ECC data 128. In the later method, the memory bank busy time is extended due to the latency of the memory controller 114 in performing the updates and in writing back the updated word to the memory bank 116. This latency is reduced by overlapping the transfer of the memory line 115 to the memory controller 114 while the tag update unit 132 is calculating the updated tag and ECC values 128 and writing the updated word back to the memory bank 116. This improvement is shown in more detail in FIGS. 5A and 5B.

Figure 5A:
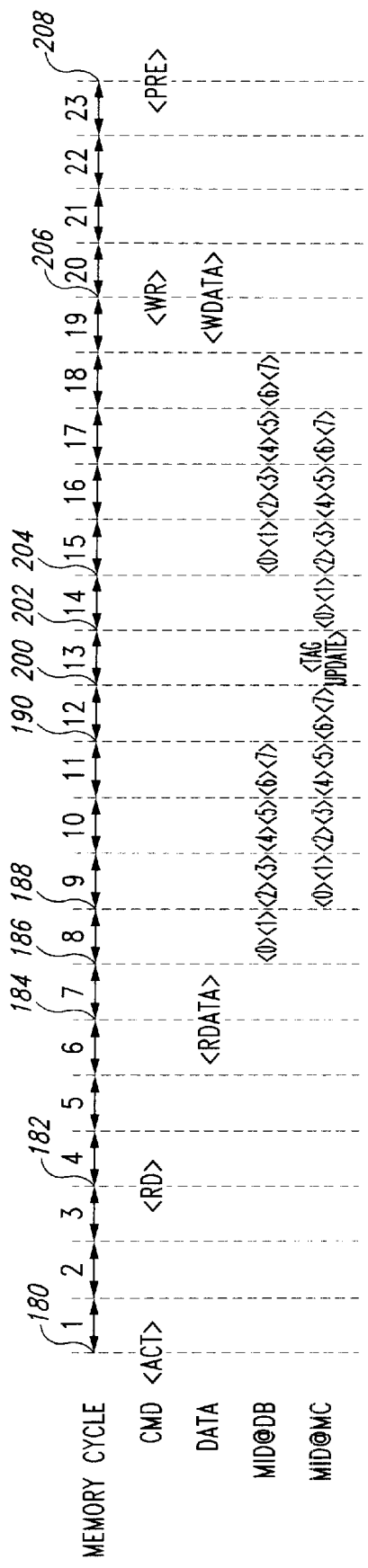
FIGS. 5A and 5B are timing diagrams illustrating exemplary memory read requests.
Figure 5B:
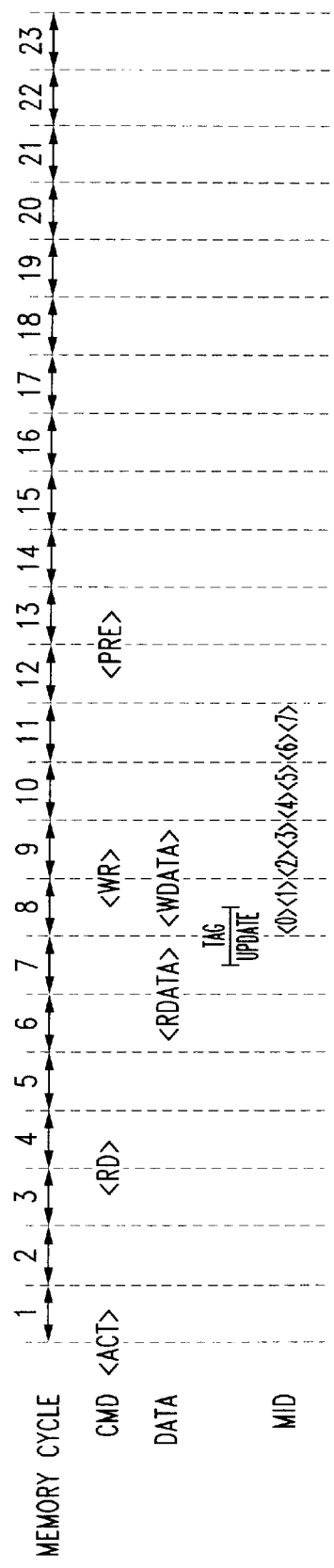

FIG. 5A illustrates an exemplary memory access timing diagram showing a read memory access for a memory subsystem not employing the technology of the present invention. FIG. 5B illustrates an exemplary memory access timing diagram showing a read memory access for a memory subsystem employing the technology of the present invention.

Referring to FIG. 5A, the memory subsystem has a memory bank coupled to a data buffer ("DB") which in turn is coupled to a memory controller ("MC"). A command signal ("CMD") is transmitted from the memory controller to the memory bank. Data is transmitted between the memory bank and the data buffer on a data path referred to as DATA. The data path between the memory controller and the data buffer is referred to as MID. The memory controller side of the MID data path is referred to as MID @ MC and the data buffer side of the MID data path is MID @ DB.

The timing diagram of FIG. 5A illustrates a read request for an eight-byte word. At the start of the first memory cycle 180, the target memory line is activated (<ACT>) in order to access the memory bank. A read command (<RD>) is placed on the command bus at the fourth memory cycle 182 and the word (<RDATA>) is transmitted from the memory bank to the data buffer on the seventh memory cycle, 184. The data buffer transmits the 8-byte word to the memory controller at memory cycle eight 186 and it is received by the memory controller at cycle nine 188. The memory controller performs a full ECC check and updates the tag and associated ECC data at cycle thirteen 200. The memory controller then transmits the updated word back to the data buffer starting at cycle fourteen 202 and it is received by the data buffer starting at cycle fifteen 204. A write command (<WR>) is place on the command bus and the updated memory line (<WDATA>) is placed on the data bus to the memory bank starting at cycle twenty 206. The write back of the updated word to the memory bank is completed at cycle twenty-three 208 and the memory bank is precharged (<PRE>) for the next memory access at the next cycle. Thus, the entire transaction utilized twenty-three memory cycles.

FIG. 5B illustrates the timing for a read request utilizing the technology of the present invention. At the start of the first memory cycle 180, the target word is activated (<AC>) in order to access the memory bank 116. A read command is placed on the command bus 136 at the fourth memory cycle 182 and the word (<RDATA>) is transmitted from the memory bank 116 to the tag update unit 132 on the seventh memory cycle 184. The tag update unit 132 calculates the updated tag and ECC data during the second half of the seventh memory cycle and the word is transmitted to the memory controller 114 at the start of the eighth memory cycle 186. The updated word is then transmitted back to the memory bank 116 at the ninth memory cycle 188 (i.e., <WR>command placed on the command bus 136 and the updated memory word, <WDATA>, placed on the data path to the memory bank 116). The write back of the word is completed at memory cycle eleven 190 and the memory bank 116 is precharged (<PRE>) for the next memory access.

When comparing the read memory requests shown in FIGS. 5A–5B, there is a eleven cycle performance improvement in utilizing the technology of the present invention. As such, the technology of the present invention reduces the memory bank's busy time and the memory bank traffic and hence, the overall performance of the computer system.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

In the claims:

1. A directory-based memory subsystem within a computer system that performs speculative tag updates, the directory-based memory subsystem comprising:
   a number of memory banks that store memory lines that include multiple words, at least one word of each memory line including a tag field that stores state information including information that identifies a memory-line owner, including one of
      a single-processor owner of the memory line, and
      multiple processors that share ownership of the memory line;
   a memory controller that reads memory lines from the number of memory banks and that writes memory lines to the number of memory banks; and
   a tag control unit that, when a memory line is read from the number of memory banks, receives the at least one tag field from the memory line, updates the at least one tag field, and speculatively writes the at least one updated tag field back to the number of memory banks, with any errors in the memory line subsequently detected, using embedded error-correcting codes, and corrected by the memory controller.

2. The directory-based memory subsystem of claim 1 wherein the memory controller corrects errors detected in memory lines read from the number of memory banks using embedded error-correcting codes by correcting the memory line according to the error-correcting code and writing the memory line back to the number of memory banks, thereby overwriting the updated tag field written to the memory banks by the tag control unit.

3. The directory-based memory subsystem of claim 1 wherein, when a memory line is read from the number of memory banks, the tag control unit receives each word of the memory line that includes a tag field that stores state information, updates the word to include updated state information in the tag field and a new error-correcting code, and writes the updated word back to the number of memory banks.

4. The directory-based memory subsystem of claim 1 wherein, when a memory line is read from the number of memory banks, the tag control unit receives each word of the memory line that does not include a tag field that stores state information and writes the word back to the number of memory banks without modifying the word.

5. The directory-based memory subsystem of claim 1 herein the tag control unit comprises a number of tag buffer units, each tag buffer unit associated with one or more tag update units.

6. A method for efficiently reading memory lines from a directory-based memory subsystem that includes a number of memory banks, a tag control unit, and a memory controller, the method comprising:
   reading the memory line, under control of the memory controller, from the number of memory banks, the memory line concurrently transmitted to the memory controller and to the tag control unit;
   updating, by the tag control unit, any tag fields within the memory line that contain state information including information indicating ownership of the tag line, and writing, by the tag control unit the updated tag fields back to the number of memory banks; and
   detecting, by the memory controller, any error in the memory line, using embedded error-correcting codes, the memory controller correcting the memory line according to the error-correcting codes and writing the corrected memory line back to the number of memory banks, overwriting any updated tag fields written back to the number of memory banks by the tag control unit.

7. The method of claim 6 wherein the tag control unit updates both tag fields and error-correcting codes within the memory line and writes the updated memory line back to the number of memory banks.

8. The method of claim 6 wherein the tag control unit receives each word of the memory line that includes a tag field that stores state information, updates the word to include updated state information in the tag field and a new error-correcting code, and writes the updated word back to the number of memory banks.

9. The method of claim 8 wherein the tag control unit receives each word of the memory line that does not include a tag field that stores state information and writes the word back to the number of memory banks without modifying the word.

* * * * *